United States Patent [19]

Miyatake et al.

[11] Patent Number: 4,803,477

[45] Date of Patent: Feb. 7, 1989

[54] MANAGEMENT SYSTEM OF GRAPHIC DATA

[75] Inventors: Takafumi Miyatake, Hachioji; Hitoshi Matsushima, Tachikawa; Shigeko Ohtani, Tokyo; Junichi Higashino, Koganei, all of Japan

[73] Assignee: Hitachi, Ltd., Tokyo, Japan

[21] Appl. No.: 942,633

[22] Filed: Dec. 17, 1986

[30] Foreign Application Priority Data

Dec. 20, 1985 [JP] Japan .................. 60-285512

[51] Int. Cl.$^4$ .............................................. G09G 1/14
[52] U.S. Cl. ................................... 340/747; 340/723; 340/799
[58] Field of Search ............... 340/747, 723, 798, 799, 340/744; 364/521

[56] References Cited

U.S. PATENT DOCUMENTS

| | | | |
|---|---|---|---|
| 4,618,858 | 10/1986 | Belch | 340/799 |
| 4,631,690 | 12/1986 | Corthout et al. | 340/747 |
| 4,660,029 | 4/1987 | Houda et al. | 340/747 |
| 4,692,880 | 9/1987 | Merz et al. | 340/747 |
| 4,700,182 | 10/1987 | Ohgami | 340/723 |
| 4,731,606 | 3/1988 | Bantz et al. | 340/723 |
| 4,742,558 | 5/1988 | Ishibashi et al. | 340/747 |
| 4,760,390 | 7/1988 | Maine et al. | 340/747 |

OTHER PUBLICATIONS

Computing Surveys, vol. 11, No. 4, 12-79, "Data Structures for Range Searching", Bentley & Friedman.

Primary Examiner—Gerald L. Brigance
Attorney, Agent, or Firm—Antonelli, Terry & Wands

[57] ABSTRACT

A graphic data management system including a segment table in which several kinds of graphic data placed in a multi-dimensional space are stored correspondingly to graphic element numbers, and an index table in which, for each of the cell numbers provided when the multi-dimensional coordinate system is partitioned into predetermined cells, and all the graphic element numbers at least a part of which included in a cell are stored. The graphic data management system carries out the search, addition and deletion referring to a segment table and the index table. The index table includes a cell pointer table in which pointers indicative of the addresses where the graphic element numbers are stored are listed for each cell number, a cell table in which the graphic element number and concatenation pointers which indicate the storing addresses of the subsequent graphic element numbers are listed as pairs, and a space management pointer indicative of the address of a free space area in the cell table.

6 Claims, 15 Drawing Sheets

MANAGEMENT SYSTEM OF GRAPHIC DATA

BACKGROUND OF THE INVENTION

This invention relates to a method for searching the graphic data included in a specified range of a graphic image displayed on a display screen in an application of map data, for example, and more particularly to a such a searching method as is preferably adapted to the case where high speed imprementation is required.

In order to effectively process graphic data on a multi-dimensional coordinate space, which are required, in an application of map data, for example, there is required such an index mechanism as can search the graphic data included in a specified range at a high speed.

As such a searching method of multi-dimensional data, several kinds of method have been investigated. For example, the method called the "cell technique" is proposed in Computing Surveys. Vol. 11, No. 4, Dec. 1979 pp. 400 to 401 (herein after referred to as reference 1). The cell technique is as follows. Point data, which means the data each having only a position but not having a size or width, is previously partitioned in a grid form in accordance with their spacial position. In searching the data, first, the cells with which the search range overlaps are checked. The data is read out only from the cells overlapped with the search range. The inclusive relation between the positions of the data and the search range is checked to provide a final search result. In this way, the number of data to be checked is limited compared with the method of checking all the data positions thus a high speed search can be realized.

Further, a method of searching multi-dimension data using the above-described cell technique is disclosed in Japanese Patent Unexamined Publication No. 58-117,077 (hereinafter referred to as reference 2). In this search method, by using the characteristic that if the two-dimensional coordinate space on which two-dimensional graphics are arranged is partitioned in plural cells, each graphic belongs to any cell region in its entirety or portion, the addresses of the graphic data, etc. within each cell region are previously registered collectively. In searching the data, only by searching the cells which satisfy a specified region condition, only the graphic data within the specified region can be searched.

In the references 1 and 2, there is only disclosed a method for searching graphic data but not disclosed a technique of adding or deleting the graphic data. However, in the application described above of such a system being used in map data there is required an index mechanism that can performed operations such as addition or deletion of data at high speed.

SUMMARY OF THE INVENTION

An object of the invention is to provide an index mechanism which can not only search graphic data at high speed but also can add or delete graphic data at high speed without enlarging the memory space.

In accordance with this invention, there are provided, as an index table structure, a cell pointer table in which pointers indicative of the addresses where graphic identification numbers are stored are listed for each cell, a cell table in which certain graphic identification numbers and a concatenation pointers indicative of the memory addresses of next graphic identification numbers are listed as pairs, and a free space (unoccupied) management pointer indicative of the addresses of unoccupied regions on the cell table, whereby the graphic data can be searched at a high speed and also added or deleted at a high speed without enlarging the memory space.

The addition of the graphic identification number is performed by writing it into the associated area of the cell table indicated or pointed by the space management pointer. Then, the contents of the concatenation pointer on the cell table and the space management pointer are renewed for each writing. In this way, the graphic numbers can be additively registered regardless of the number of data in the index table.

The deletion of the graphic identification number is performed as follows. For a cell associated with the graphic identification number to be deleted, a search is initiated from the cell pointer table. The address of the graphic identification number to be deleted is found by reading out the graphic identification numbers of the cell table. The address of the associated region is written in the space management pointer as a sign of the deletion. Then, the concatenation pointer and the cell pointer are renewed. In this way, the graphic identification number to be deleted can be searched at a high speed since the searching is required only for the associated cells. Further, the memory can be effectively used since the deleted region of the cell table can be reused in the next addition operation.

BRIEF DESCRIPTION OF THE DRAWINGS

The above and other objects, features and advantages of this invention will be more cleary understood from the following detailed description taken in conjunction with the accompanying drawings.

FIGS. 2A to 2C are views for explaining the methods of partitioning a graphic data into cells, wherein FIG. 2A shows the case where the graphic data is a dot or point, FIG. 2B shows the case where it is a line segment and FIG. 2C shows the case it is an area;

FIG. 3 is a view showing one example of the graphic data and the search region therefor;

DESCRIPTION OF THE PREFERRED EMBODIMENTS

Figure 1:
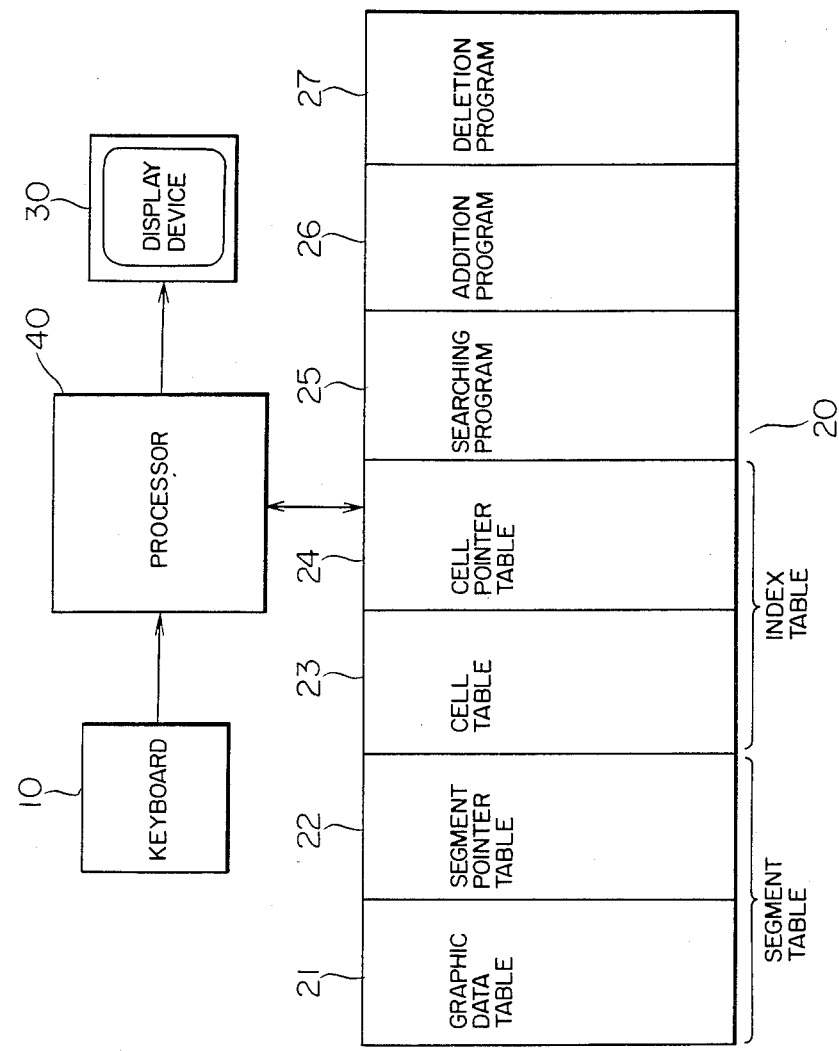
FIG. 1 is a diagram showing one example of the system structure for implementing this invention.

Referring now to FIG. 1, there is shown a system structure for performing the search in accordance with this invention.

In FIG. 1, 10 is a keyboard for inputting a searching region using a cursor.

20 is a RAM in which a graphic data table 21, a segment pointer table 22, a cell table 23, a cell pointer table 24, a searching program 25, an addition program 25 and a deletion program 27 are stored.

The graphic data table 21 stores, for each graphic element number (referred to as a segment number), coordinate data of characteristic points constituting each segment and the number of the characteristic points.

In the following explanation, a combination of the graphic data table 21 and the segment pointer table 22 will be referred to as a segment table, and a combination of the cell table 23 and the cell pointer table 24 will be referred to as an index table.

40 is a processor which, referring to the segment table and the index table stored in the RAM 20, searches the graphic data within a specified searching range in accordance with the searching program stored in the RAM 20. The processor 40 adds a graphic data in accordance with the addition program stored in the RAM 20, and deletes a graphic data in accordance with the deletion program stored in the RAM 20.

30 is a display device for displaying the graphic data of the result of seaching.

In the system structure as mentioned above, the searching of the graphic data will be performed as follows. First, a searching range is specified by the keyboard 10. Then, the processor 40 obtains cells overlapped with the searching range, and reads out the segment numbers corresponding to the obtained cells referring to the index table. Next, the processor 40, referring to the segment table, reads out the coordinate data corresponding to the above read-out segment numbers to check the inclusive relation thereof with the specified searching range. Finally, the segments included in the specified searching range are displayed, as a searching result, on a display device 30.

Incidentally, the searching range may be also specified by an input from a pointing device such as a mouse or by an automatic provision from e.g. a computer program as well as the keyboard input as mentioned above. The processor 40 is preferably a general-purpose computer but, for some purposes, may be such a computer as is used for processing the data to be searched. The display device 30 is preferably such a display device as can display the vectors of the coordinate data stored on the segment table since the searching result is desired to be displayed.

Figure 2A:
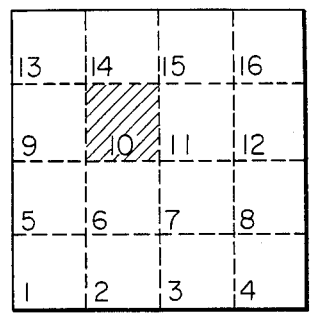
Figure 2B:
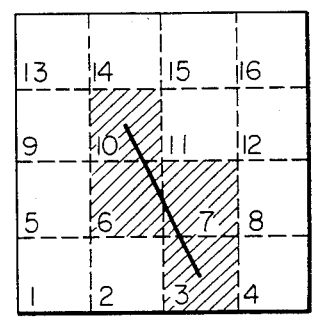
Figure 2C:
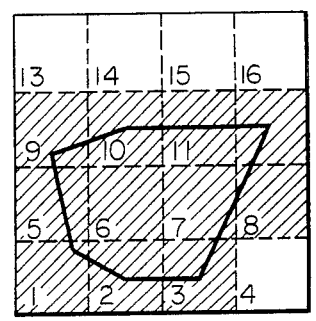
Figure 2A:
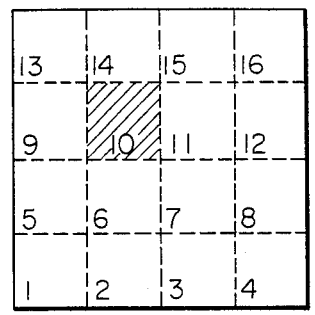
Figure 2B:
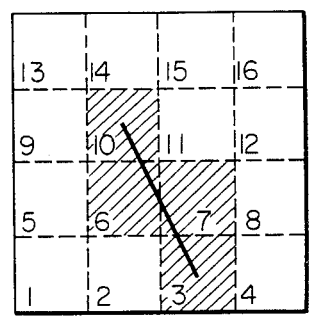
Figure 2C:
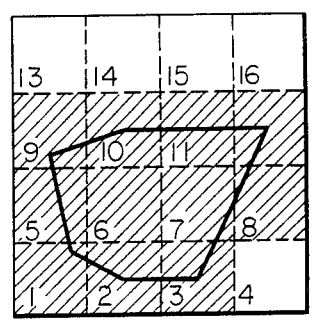

FIGS. 2A to 2C show the methods for partitioning a graphic data in accordance with this invention. FIG. 2A shows the case where it is a point; FIG. 2B the case where it is a segment; and FIG. 2C shows the case where it is an area. In the figures, the indicated numerals are cell numbers, and the hatched portion is the cells occupied by the graphic data. FIG. 2A shows that the point data belongs to a cell number 10; FIG. 2B shows that the line segment data belongs to the cells passed by the data, i.e. cell numbers 3, 6, 7 and 10; and FIG. 2C shows that the area data belongs to the cells passed or included by the data, i.e. cell numbers 1, 2, 3, 5, 6, 7, 8, 9, 10, 11 and 12.

FIG. 3 shows one example of the graphic data, cell partition and searching region when the range searching is made in accordance with this invention. In the following explanation of the index table and the segment table, this graphic data will be adopted as an example.

In FIG. 3, segments denote ①, ② and ③ denote graphic idenfication numbers. The segment ① is constituted by five coordinate points $P_1$, $P_2$, $P_3$, $P_4$ and $P_5$; the segment ② is constituted by two coordinte points $P_1$ and $P_5$; and the segment ③ is constituted by three coordinate points $P_1$, $P_6$ and $P_5$. Character R denotes a searching region having a shape of a rectangle, for example. The bottom left coordinate of the rectangle is referred to as (Xs, Ys) while the top right coordinate thereof is referred to as (Xe, Ye). Character D denotes the size of a cell which is illustrated as a square. NXMAX is the number of cell partitions in the direction of one coordinate, e.g. 4. In FIG. 3, the segment ① belongs to cell numbers 1, 2, 3, 5, 9 and 10; the segment ② belongs to cell numbers 3, 7, 6 and 10; and segment ③ belongs to cell numbers 3, 7, 8, 10, 11 and 12.

Figure 4:
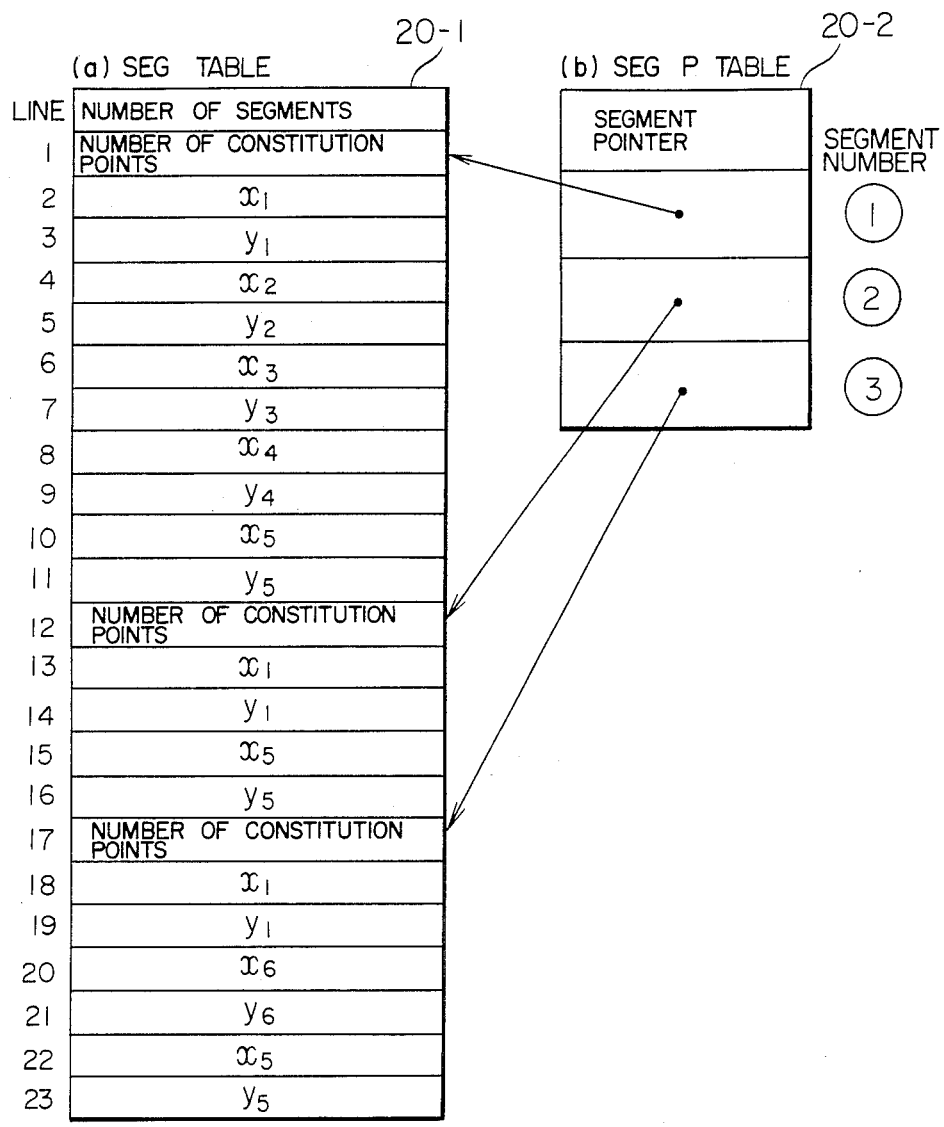
FIG. 4 is a view of the data structure of a segment table.

FIG. 4 shows one example of the concrete data structure of the segment table, which is constructed by a graphic data table (referred to as SEG table) 20-1 in which an array of coordinate points of the segment are stored and a segment pointer table 20-2 (referred to as SEGP table) in which the top storing destination address of each segment number is stored. The SEG table 20-1 stores, as one example, the graphic data as shown in FIG. 3. The SEGP table stores at the top the storage destination address of each of the segments in the SEG table 20-1. More specifically, it stores the addresses of the areas where the numbers of constitution points are stored. For example, the segment pointer corresponding to the segment number ① stores an address 1 of the area where the number of the constitution points of 5 is stored.

The access to the coordinate data of the segment table is performed as follows. The pointer of the SEGP table 20-2 is read out from the segment number in issue, and the graphic data in the SEG table 20-1 specified by that point is read out. More specifically, assuming that the segment number is SEG No., the number of constitution points of the coordinate points of the SEG No. can be read out by SEG (SEGP (SEG No.))

And the coordinate data can be read out from the subsequent address onward.

The segment table shown in FIG. 4 is only one description example of graphic data. The graphic data may be described, as required, by such a data structure as having attendant information of the kinds of line segments and others.

Figure 5A:
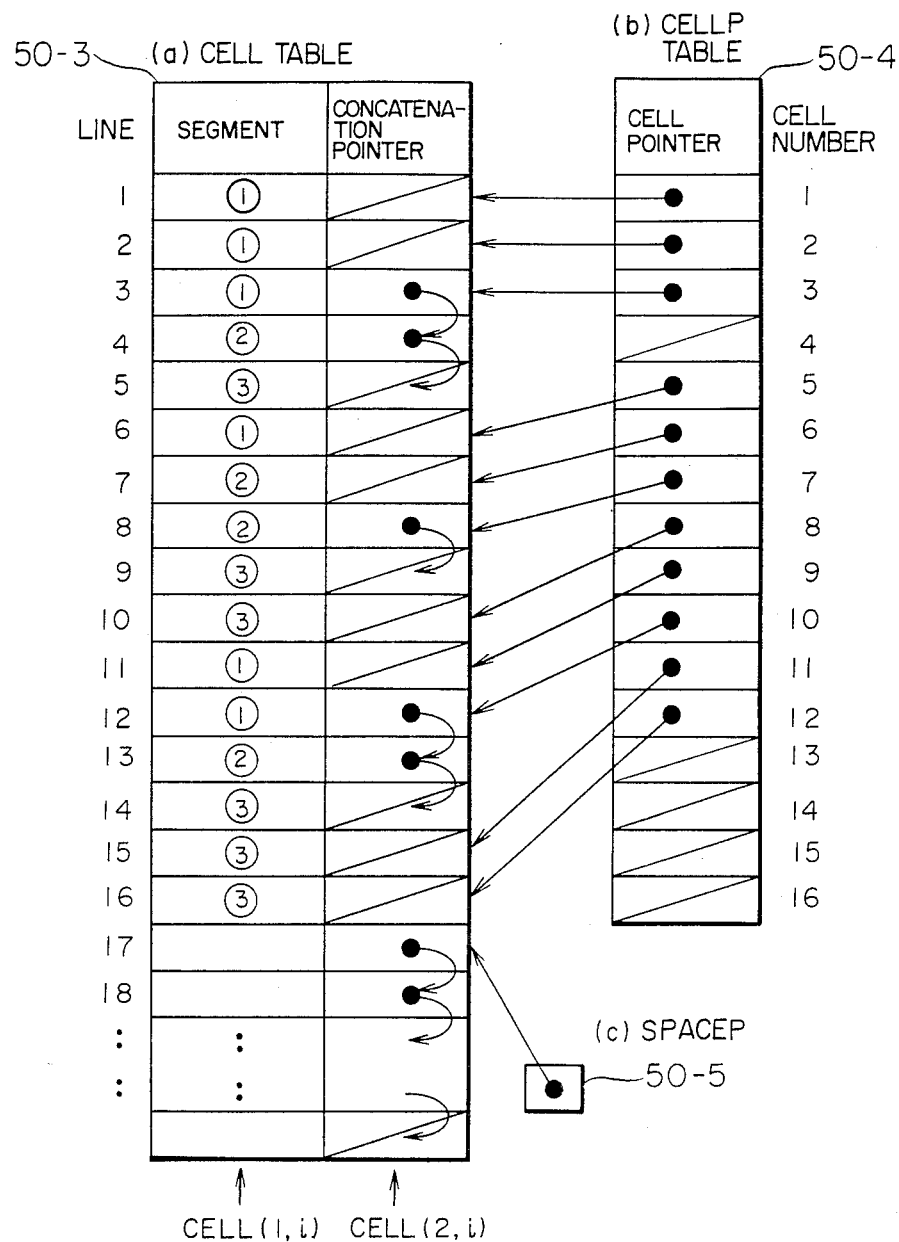
FIG. 5A is a view of the data structure of an index table.

The data structure of the index table in accordance with this invention is shown in FIG. 5A. This data structure is constituted by a cell (CELL) table 50-3, a cell pointer (CELLP) table 50-4, and a space management pointer (SPACP) 50-5.

The CELL table 50-3 is a list consisting of pairs of a segment number and a concatenation pointer. The segment numbers with the same cell number are contatenated by the concatenation pointers. Black circle symbols are pointers where address information is stored. Slanted lines mean that the associated segment number is a final segment number of each cell number, beyond which no data is concatenated. For example, as a concrete numerical value, 0 is placed there.

The CELLP table 50-4 is a table of a group of cell pointers indicative of the storing addresses of the segment numbers on the CELL table 50-3, corresponding to respective cell numbers. Black circle symbols are pointers where address information is stored. Slanted lines mean that no segment is placed in the associated cells. For example, as a concrete numerical value, 0 is placed there.

The SPACEP 50-5 previously stores the address information indicative of the top of a list of the space areas of the CELL table 50. The space areas on the CELL table are concatenated by the concatenation pointers as shown in FIG. 5A. In the example of FIG. 5A, the areas from the 17th line onward are managed by the SPACEP 50-5.

Figure 5B:
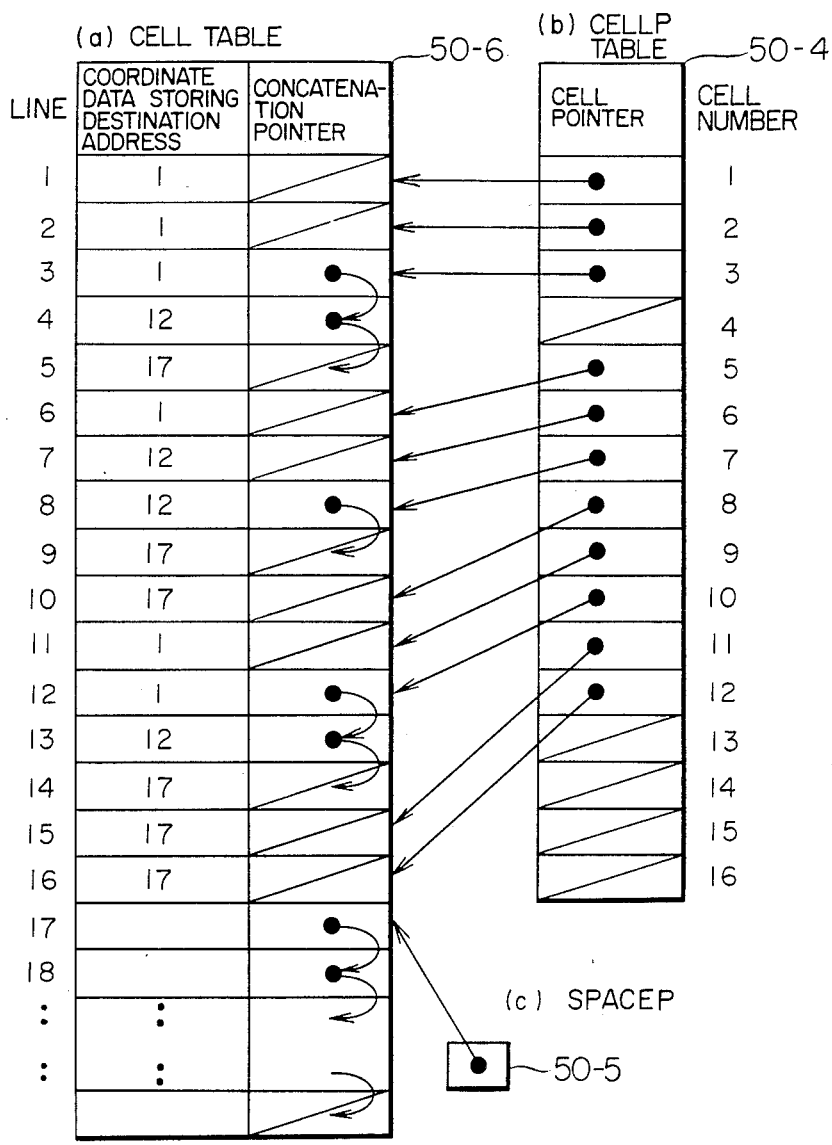
FIG. 5B is a view of the data structure of another index table.

Incidentally, as shown in FIG. 5B, the index table may be constituted by a CELL table 50-6 and a CELLP table 50-4. The CELL table 50-6 is a list consisting of pairs of a graphic data storing destination address and a concatenation pointer. If the index table shown in FIG. 5B is adopted, the SEG table 20-1 can be directly accessed without the SEGP table 20-2 shown in FIG. 2.

Thus, the concrete example of the data structure in accordance with this invention has been explained. The searching method using this data structure will be explained below referring to the flowchart of FIGS. 6A to 6C.

The searching process is carried out by the processor 40. The searching process roughly consists of five steps, i.e., processes 100 and 200 shown in FIG. 6A, a process 300 shown in FIG. 6B and processes 400 and 500 shown in FIG. 6C. The searching process is carried out in the sequence of the processes as mentioned above.

The process 100 is to input a searching region corresponding to the coordinates (Xs, Ys) and (Xe, Ye) from the keyboard.

The process 200 is to take out the cell(s) overlapped with the searching region of (Xs, Ys), (Xe, Ye) and to extract all the associated segment numbers in the index table of FIG. 5A.

The process 300, if some of the picked-up segment numbers are repeated, is to delete those segment numbers other then one of such a segment number. The process is required since in this invention, in some cases, one segment may be registered in many cells and thus the segment number may be repeatedly extracted.

The process 400 is to access the segment table of FIG. 4 for each segment number with its repetition eliminated so as to read out its coordinate data, to check the searching range (Xs, Ys), (Xe, Ye) and the detailed inclusive relations and to output the included segment numbers as a searching result. In this way, the coordinate data of the segment table of FIG. 4 to be actually read out is limited so that a high speed effect can be enhanced. If the number of data in each cell is generally F, the searching can be executed with a processing amount of the order of F.

The process 500 is to output the searching result as graphic data to the display device 30.

Hereinafter, each process will be further explained in detail.

The process 100 specifies here the range of a rectangle shape.

Figure 6A:
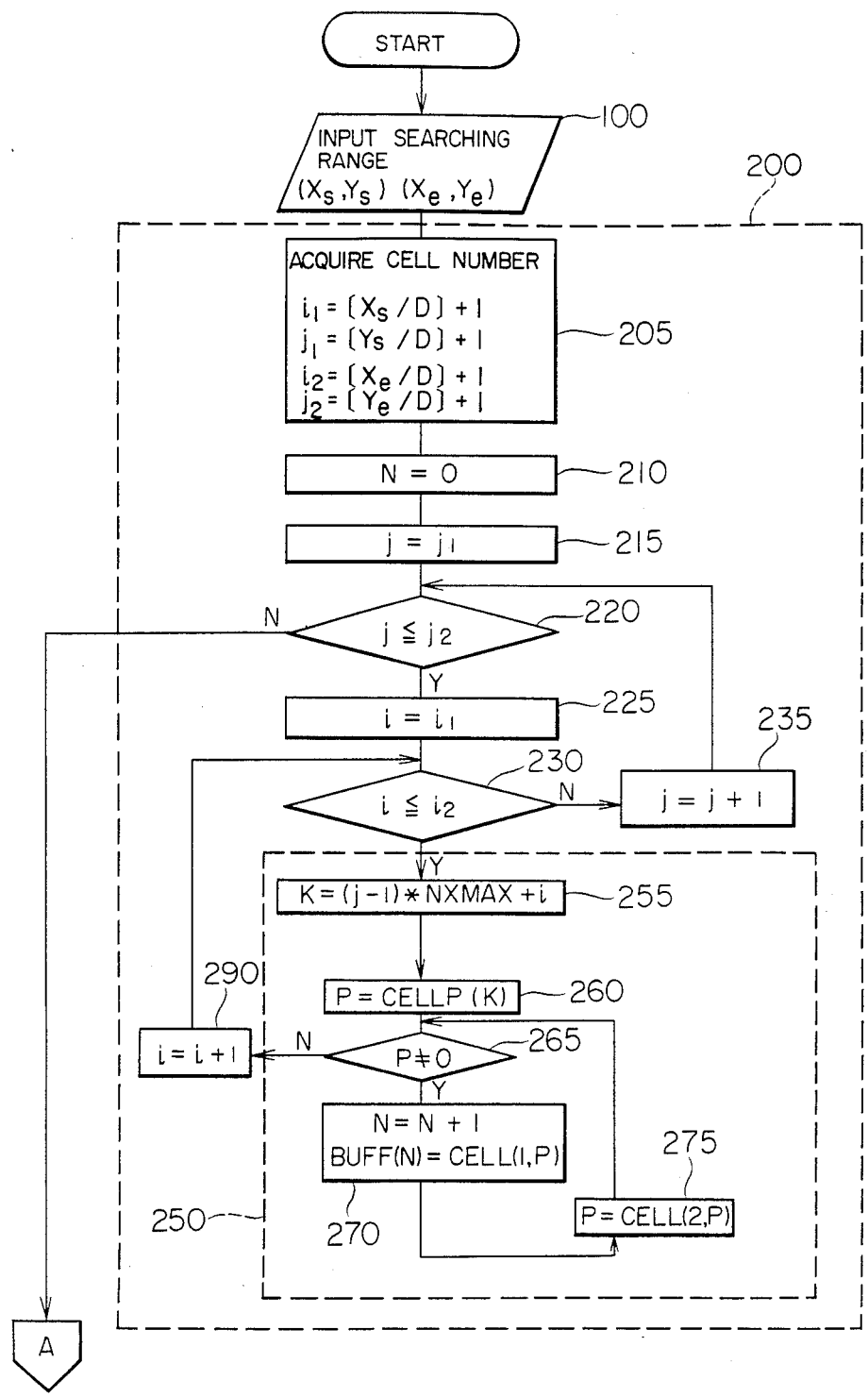
FIGS. 6A, 6B and 6C are flowcharts of the searching process in accordance with this invention.

The process 200 will be explained with reference to FIG. 6A.

First, in a process 205, the cell numbers are taken from the searching region (Xs, Ys), (Xe, Ye) in the following manner. More specifically, the cell number is the number of each cell when a certain coordinate space is partitioned with a cell size of D. If the coordinate space is a first quadrant, the cell number K corresponding to a certain point (X, Y) can be obtained by Equation (1).

$$K = (j-1) * \text{NXMAX} + i \quad (1)$$

where i and j are partition numbers in the X and Y coordinates, respectively, which has the values represented by Equation (2).

$$i = [X/D] + 1$$
$$j = [Y/D] + 1 \quad (2)$$

NXMAX indicates the number when the coordinate space is partitioned, in the X coordinate, into limited parts but not unlimited parts. It may be typically the number such as can cover the coordinate space in the segment table of FIG. 4. Incidentally, the cell number K is equivalent to the cell number (i, j) in a two-dimensional representation. The process 205, from Equation (2), calculates, with respect to the cells occupied by the searching range, the start i1 and end i2 of the partition numbers in the X coordinate and the start j1 and end j2 of those in the Y coordinate.

Next, a process 210 initializes counter N, to zero; the counter stores the total number of the segment numbers extracted from the index table of FIG. 5A.

Processes 215, 220, 225, 230, 235 and 290 are a process for scanning all the cell coordinates (i, j) from i1 to i2 and from j1 to j2, which constitute double DO loop programs.

A process 250 accesses the index table of FIG. 5A when the cell numbers are provided and extracts the associated segment numbers. More specifically, first, a process 255 translates the given cell coordinate (i, j) into the cell number K from Equation (1). Next, a process 260 reads out the cell pointer corresponding to the cell number K from the CELLP table 50-4, thereby setting it to a pointer P. A process 265 checks whether or not the pointer is zero. If the pointer P is zero, which means that the segment number doesn't exist, the process is terminated. If the pointer P is not zero, a process 270, after having renewed the counter N, which stores the total number of the segment numbers, by 1, reads out the segment number pointed to by the pointer P from the CELL table 50-3, registering it a buffer Buff. Thereafter, a process 275 reads out the concatenation pointer CELL (2, P) to set it to the pointer P. Thus, the process by the process 250 is returned to the process 265.

Accordingly, at the time of having completed the process 200, in the buffer Buff are stored a group of N segment numbers in the cells overlapped with the searching range.

Figure 6B:
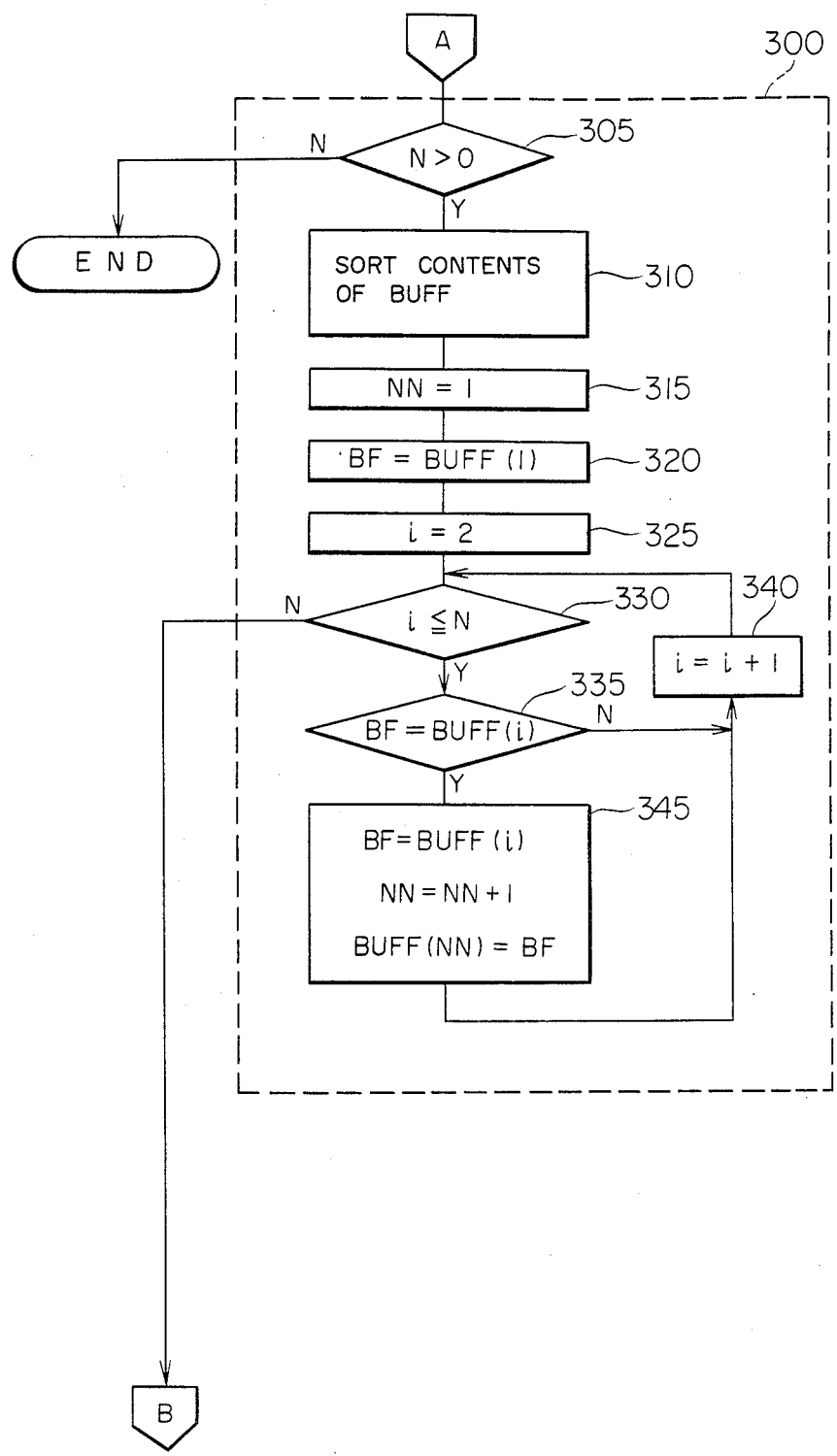

The process 300 will be explained with reference to the flowchart of FIG. 6B. The process 300 performs the following processing in order to remove the repetitions of the N segments stored in the buffer Buff.

First, a process 305 checks whether or not the counter N is zero. If it is zero, the subsequent process are not performed, thereby terminating the whole searching process. If it is 1 or more, a process 310 sorts the contents of the Buff in the sequence of the segment numbers.

Next, a process 315 initializes a counter NN to 1; the counter stores the total number of the segment numbers after their repetions have been removed. A process 320 previously the first data Buff (1) of the Buff to a variable BF, and thereafter searches the Buff to find the repeated data and remove them.

Processes 325, 330 and 340 are searching process, which constitute a single DO loop; the loop variable i in this case ranges from 2 to N. A process 335 compares the variable BF with Buff (i). If a coincidence is provided, the segment number of Buff (i) is interpreted to have a repetion(s) and so thrown away. A process 340 follows to check the subsequent Buff (i). If a non-coincidence is provided, a process 345 reloads the data in the Buff and renews the contents of the counter NN. Thereafter, the process 340 follows.

At the time when the process 300 has been completed, the NN number of the segment numbers each having no repetion are extracted in the Buff.

The process 400 will be explained with reference to FIG. 6C. The process 400 accesses the segment table for each of the NN number of the segment numbers within the Buff so as to read out its coordinate data, checks the searching range (Xs, Ys), (Xe, Ye) and the detailed inclusion relations and outputs the included segment numbers as a final searching result.

First, a process 405 initializes a counter M to zero; the counter M stores the number of the segments to be searched.

Next, all the segment numbers within the Buff are successively searched. For this purpose, a loop consisting of processes 410, 415, and 435 is provided; the loop variable i in this case ranges from 1 to NN.

A process 420 reads out the number of constitution points at the coordinate points of the SEG table 40-1 corresponding to the segment number of the Buff (1), and set it to a variable NKO.

Since this segment is constituted by the vectors each with NKO−1, the vectors are successively read out to check the inclusion of the coordinate data. For this purpose, a loop consisting of processes 425, 430 and 455; the loop variable is j.

A process 440 reads out the vectors from the SEG table 40-1, and more specifically reads out them in the following manner, assuming that the vectors have a start coordinate $(X_1, Y_1)$ and an end coordinate $(X_2, Y_2)$ $X_1 = SEG\ (SEGP\ (Buff\ (i)) + j)$ $Y_1 = SEG\ (SEGP\ (Buff\ (i)) + j + 1)$ $X_2 = SEG\ (SEGP\ (Buff\ (i)) + j + 2)$ $Y_2 = SEG\ (SEGP\ (Buff\ (i)) + j + 3)$ A process 445 checks whether or not the vector is included in the searching range. If it is not included, a process 455 follows to read out the subsequent vector. If it is included, a process 460 registers the associated segment number in the Buff; then the variable M of storing the number of the segments to be searched is renewed by 1. If it has been found that any one vector is included in the searching region, then, a process 435 follows to read out the subsequent segment number.

At the time when the above process 400 has been completed, M segment numbers are stored, as a searching result, in the Buff.

Figure 6C:
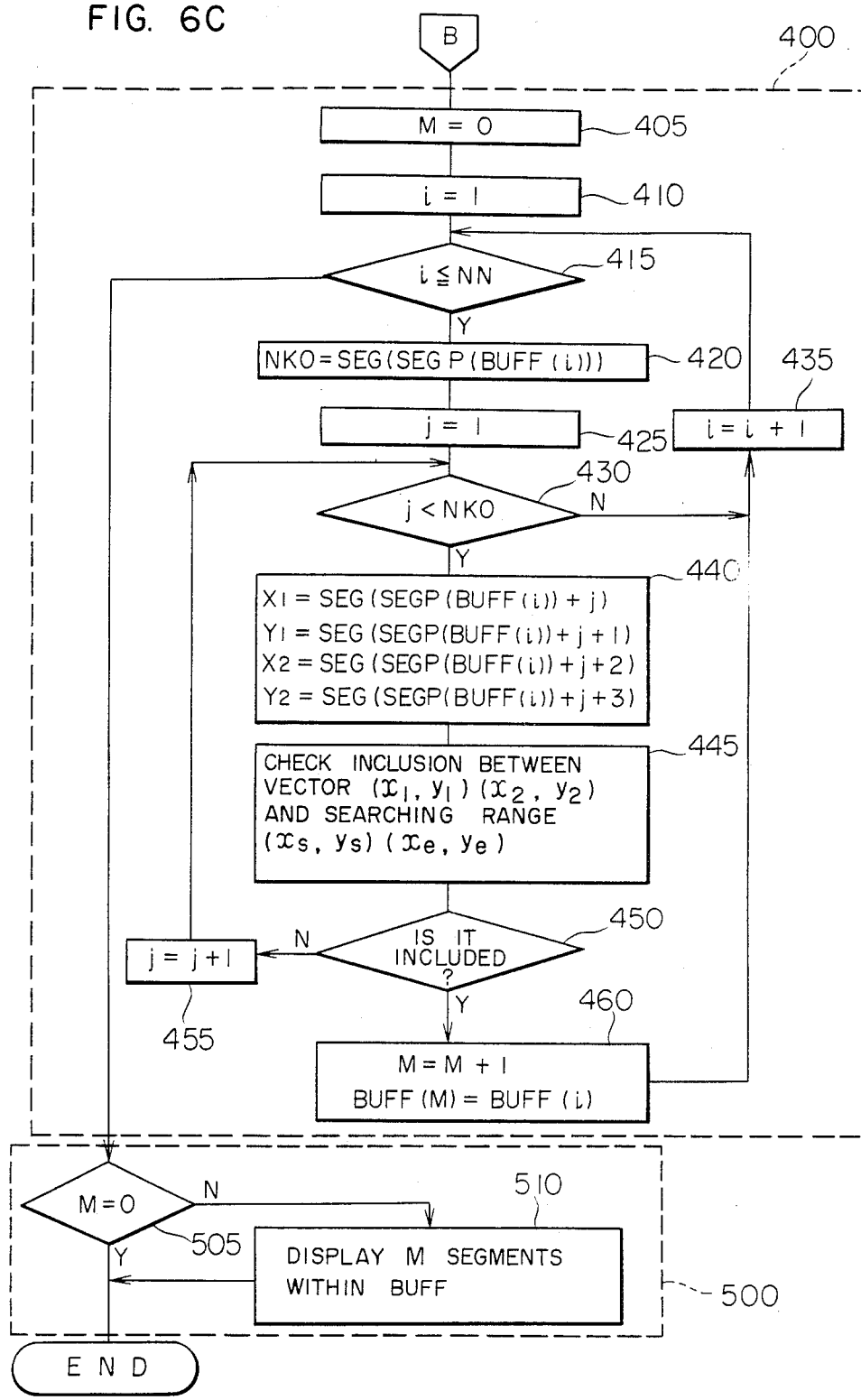

The process 500 displays the searching result within the Buff on the display device, as shown in FIG. 6C. A process 505 checks whether or not M is zero. If it is zero, the display is not required. If it is not zero, a process 510 displays the M segments in the Buff on the display device 30.

Referring now to the graphic data shown in FIG. 3 and the index table of FIG. 5A, the searching process of graphic data when the searching range is set as R as shown in FIG. 3 will be explained.

First, the process 100 inputs the searching range R as shown in FIG. 3.

The process 200 takes out the cell numbers 6 and 7 overlapped with the searching range R, and extracts, referring to the index table of FIG. 5A, all the segment numbers corresponding to the cell numbers indexed. The segment number pointed to by a cell pointer corresponding to the cell number 6 is ②, and the segment numbers pointed by a cell pointer corresponding to the cell number 7 are ② and ③. Thus, the segment numbers ②, ②, and ③ are extracted.

The process 300 deletes the repeated segment numbers, extracted in the process 200, other than one of such a segment number. Of the segment numbers ②, ②, and ③ extracted in the process 200, the segment ② is repeated, so that one of them is left and the other is deleted. Thus, the process 300 provides the segment numbers ② and ③.

The process 400, referring to the segment table of FIG. 4, reads out the coordinate data corresponding to the segment numbers ② and ③ and provided by the process 300. The coordinate data pointed to by the segment pointer corresponding to the segment number ② are $(x_1, y_1)$ and $(x_5, y_5)$, and the coordinate data pointed by the segment pointer corresponding to the segment number ③ are $(x_1, y_1)$, $(x_6, y_6)$ and $(x_5, y_5)$. Thereafter, the process 400 checks whether or not the vector(s) constituting each segment are included in the searching range R. The segment ② is constituted by the vector having a start coordinate point $(x_1, y_1)$ and an end coordinate point $(x_5, y_5)$. This vector is included in the searching range R. The segment ③ is constituted by the vector having a start coordinate point $(x_1, y_1)$ and an end coordinate point $(x_6, y_6)$ and the vector having a start coordinate point $(x_6, y_6)$ and an end coordinate point $(x_5, y_5)$ Both vectors are not included in the searching range R. Accordingly, the process 400 extracts only the segment ②.

The process 500 displays the segment ② as a searching result.

Now referring to the flowchart of FIG. 7, a process of adding a segment number to the index table will be explained. This process will be performed, using, as inputs, the segment number SEG No. to be added and the cell number(s) CELL No's, as follows.

First, a process 700 writes the SEG No. in the term of the segment number of the CELL table 50-3, pointed to by a space management pointer SPACEP, that is, executes CELL (1, SPACEP) = SEG No.

A process 705 reads out the address representative of the concatenation pointer of the CELL table 50-3 now written to save it to a pointer P, that is, executes

P=CELL (2, SPACEP)

A process 710 reads out the address of the CELL table 50-3 now pointed to by the cell pointer of the CELLP table 50-4 and writes it in the concatenation pointer of the CELL table 50-3 now written, that is, executes CELL (2, CELL No.)=CELLP (CELL No.)

A process 715 changes the cell pointer corresponding to the CELL No. of the CELLP table 50-4 into the contents now pointed to by the space management pointer, that is, executes CELLP (CELL No.)=SPACEP Finally, a process 720 writes the contents of the pointer P into the space management pointer SPACEP, that is, executes

SPACEP=P

Figure 7:
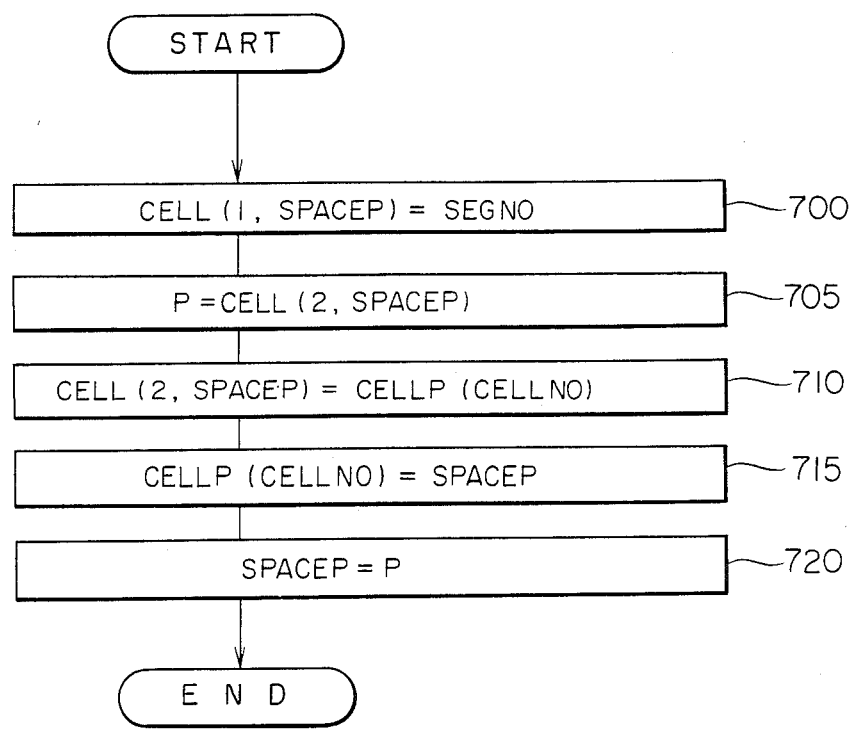
FIG. 7 is a flowchart of the addition process of a graphic data in accordance with this invention.

In accordance with the process mentioned in connection with FIG. 7, the segment number newly added is always represented by the cell pointer of the CELLP table, i.e., is registered as the part of the list. The process of addition can be performed only by five steps regardless of the data amount placed on the index table. The addition cost is the order of 1.

Figure 8:
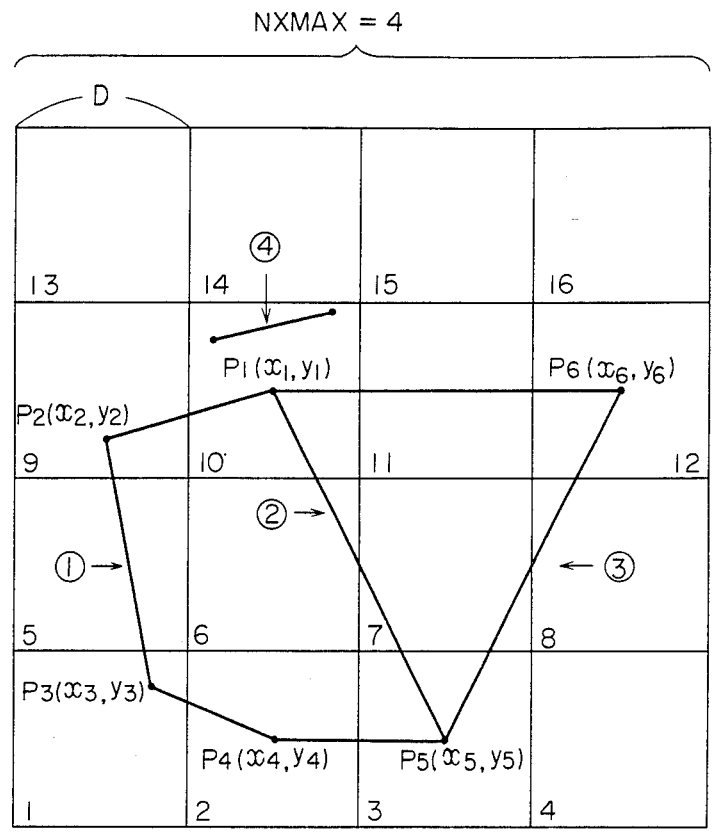
FIG. 8 is a view showing the graphic data of FIG. 3 with a graphic data newly added.
Figure 9:
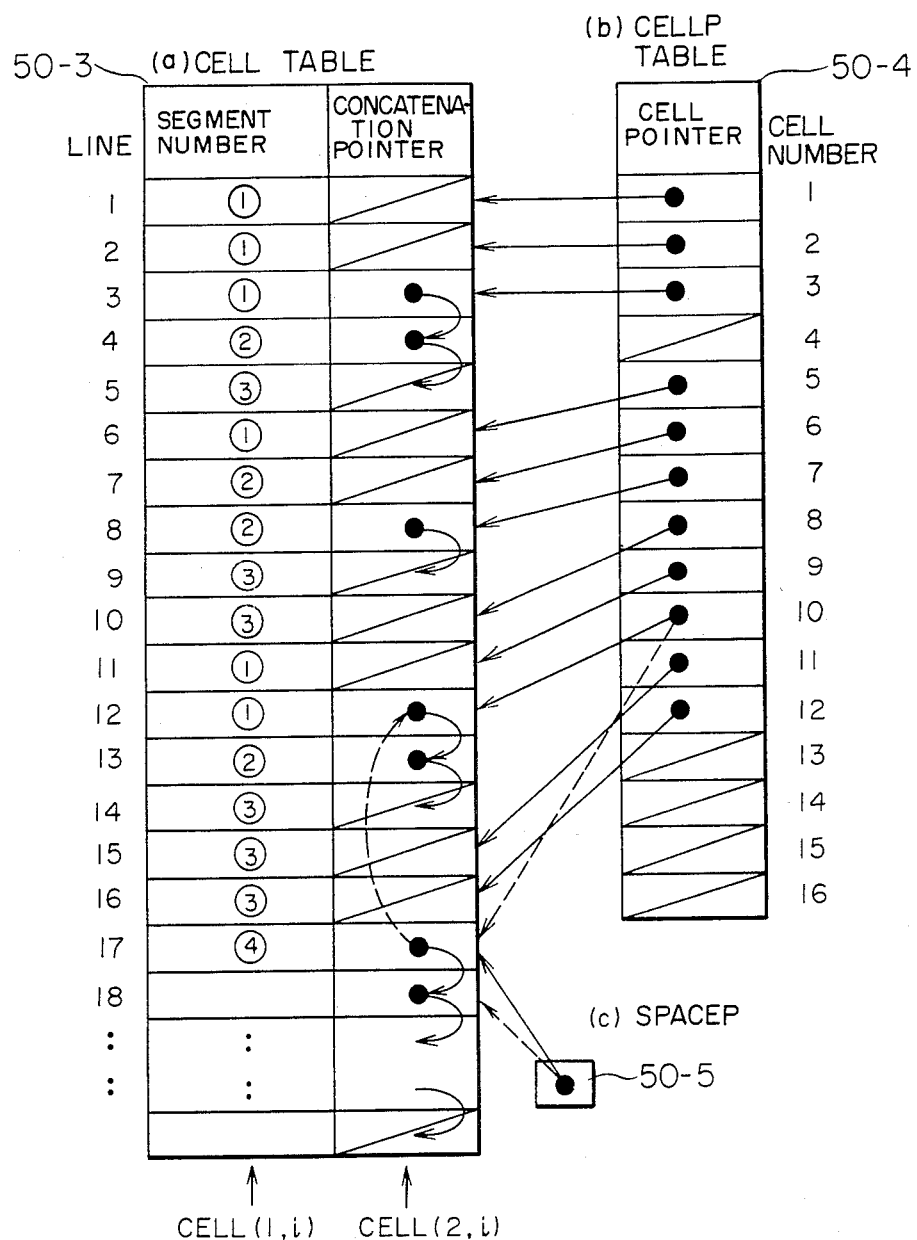
FIG. 9 is a view for explaining the method for operating the index table shown in FIG. 5A when the addition of a graphic data is performed.

Now referring to the graphic data shown in FIG. 8 and the index table shown in FIG. 9, the addition process of a segment 4 in an area of the cell number 10 in FIG. 3 will be explained. FIG. 8 shows a graphic when the segment 4 has been added to the graphic data of FIG. 3. FIG. 9 shows the operation of the index table of FIG. 5A when the segment 4 is added. The dotted lines in FIG. 9 indicate point destinations after the addition process has been performed.

First, the process 700 writes the segment number 4 in the term of the segment number of the CELL table 50-3, pointed to by the space management pointer SPACEP, i.e. the 17-th line.

Next, the process 705 reads out the address 18 representative of the concatenation pointer of the CELL table 50-3 now written to save it as a pointer P.

The process 710 reads out the address 12 of the CELL table 50-3 now pointed to by the cell pointer of the CELLP table 50-4 and writes it in the term of the concatenation pointer of the CELL table 50-3 now written, i.e., in the 17-th concatenation pointer.

The process 715 changes the cell pointer corresponding to the cell number 10 of the CELLP table 50-4 into the contents now pointed to by the space management pointer, i.e. the address.

Finally, the process 720 writes the contents of the pointer P, i.e., the address 18, which has been temporarily saved, into the space management pointer SPACEP.

Thus, the process of adding the segment 4 is ended.

Figure 10:
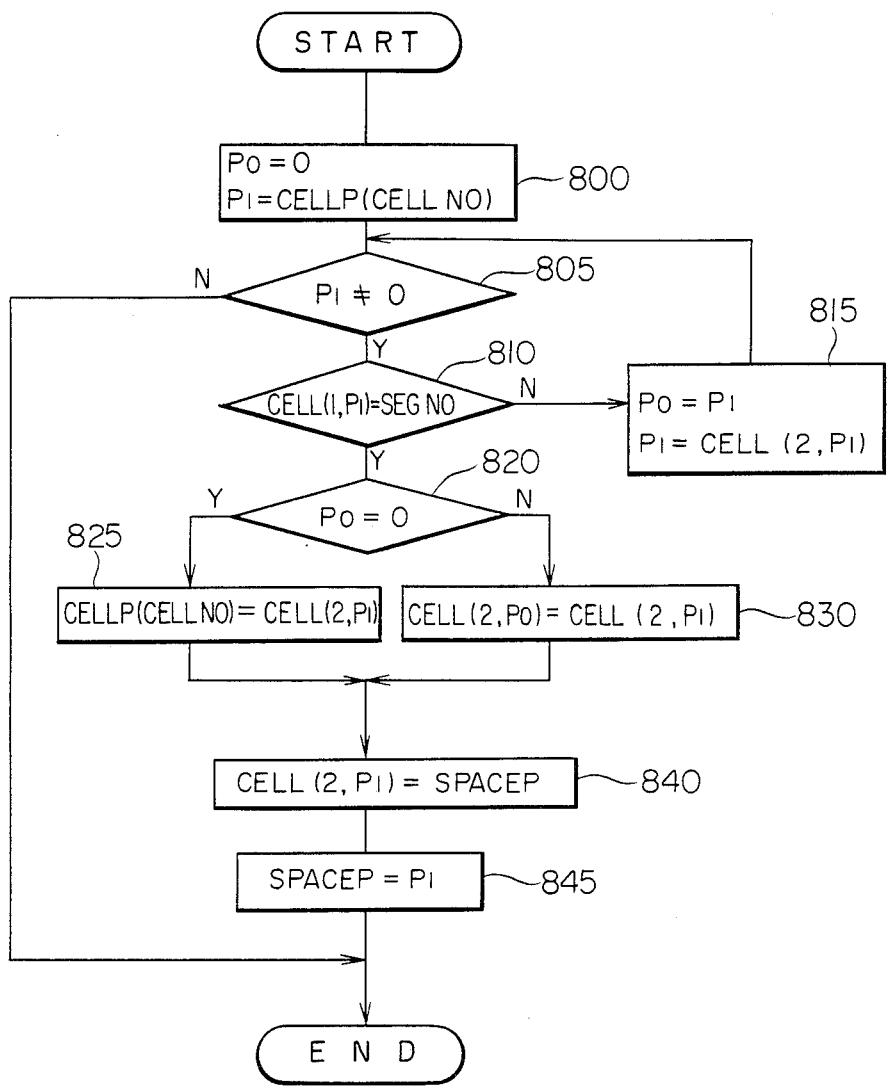
FIG. 10 is a flowchart of the deletion process of a graphic data in accordance with this invention.

Now referring to the flowchart of FIG. 10, a process of deleting a segment number from the index table will be explained. In the flowchart, a variable $P_0$ stores the contents of the pointer which has been searched immediately before, and a variable $P_1$ stores the contents of the pointer which is now being searched. This process of deletion will be performed, using, as inputs, the segment number SEG No. which is used as an object of deletion and the cell number(s) to which that segment number belongs, as follows.

First, a process 800 initializes the variable $P_0$ to zero, and initializes the variable $P_1$ to the contents of the cell pointer corresponding to the cell number CELL No. of the CELLP table 50-4, that is, $P_0=0$ $P_1=$CELL (CELL No.)

Next, the segment number pointed to by the variable $P_1$ is read out from the CELL table 50-3 to search the cell number which coincides with the cell number SEG No to be deleted (i.e., an object of deletion). For this purpose, a process consisting of process 805, 810 and 815. The process 805 checks whether or not the variable $P_1$ is zero. If it is zero, the process of deletion is ended since this means that the segment number to be deleted was not registered from the beginning. If the variable $P_1$ is not zero, the process 810 checks whether or not the CELL table 50-3 segment number coincides with the segment number SEG No. to be deleted. If not, the process advances to the process 815 and the search is continued. The process 815, after having written the variable $P_1$ now being indicated in the variable $P_0$, reads out the contents of the concatenation pointer of the cell table 50-3 to renew the variable $P_1$, that is, executes $P_0=P_1$ $P_1=$CELL (2, $P_1$)

and thereafter the process is returned to the process 805.

On the other hand, if the segment number to be deleted has been found, a process consisting of processes 820, 825, 830, 840 and 845 follows for the listing operation of deletion.

A process 820 checks whether or not the area of the CELL table 50-3 to be deleted is a top of the list. If the variable $P_0$ is zero, the CELLP table 50-4 is renewed. If it is not zero, the concatenation pointer of the CELL table 50-3 pointed by the cell pointer immediately before the cell pointer now being searched is renewed.

The process 825 writes the contents of the concatenation pointer of the area of the CELL table 50-3, to be deleted, into the cell pointer of the CELLP table 50-4 associated with the cell number CELL No. to which the segment number SEG No. to be deleted belongs, that is, executes CELLP (CELL No.)=CELL (2, $P_1$)

The processing 830 writes the contents of the concatenation pointer of the area of the CELL table 50-3, to be deleted, into the concatenation pointer of the CELL table 50-3 pointed by the immediately before cell pointer, that is, execute CELL (2, $P_0$)=CELL (2, $P_1$)

The processes 840 and 845 sends back the deleted CELL 50-3 area through the space management pointer SPACEP so that it can be reused as a space area at another addition operation. More specifically, the process 840 reads out the contents of the space management pointer SPACEP and writes it in the concatenation pointer of the deleted CELL table 50-3 area, that is, executes

CELL (2, P₁)=SPACEP

Thus, the deleted area is sent back to the top of a list of the space areas. Next, the process 845 writes the contents of the variable P₁ in the SPACEP, that is, executes

SPACEP=P₁

Thus, the deletion process is ended. The deleted area is always located at the top of the space area list so that another addition process may first use this deleted area.

The deletion process mentioned above limits the CELL table 50-3 to the specified cell number to search the segment number to be deleted so that the deletion cost is the order of F (F: the number of data in each cell), enhancing the operation speed to the same or more degree as in the searching operation. The memory space can also be saved since the deleted area can be dynamically reused.

Figure 11:
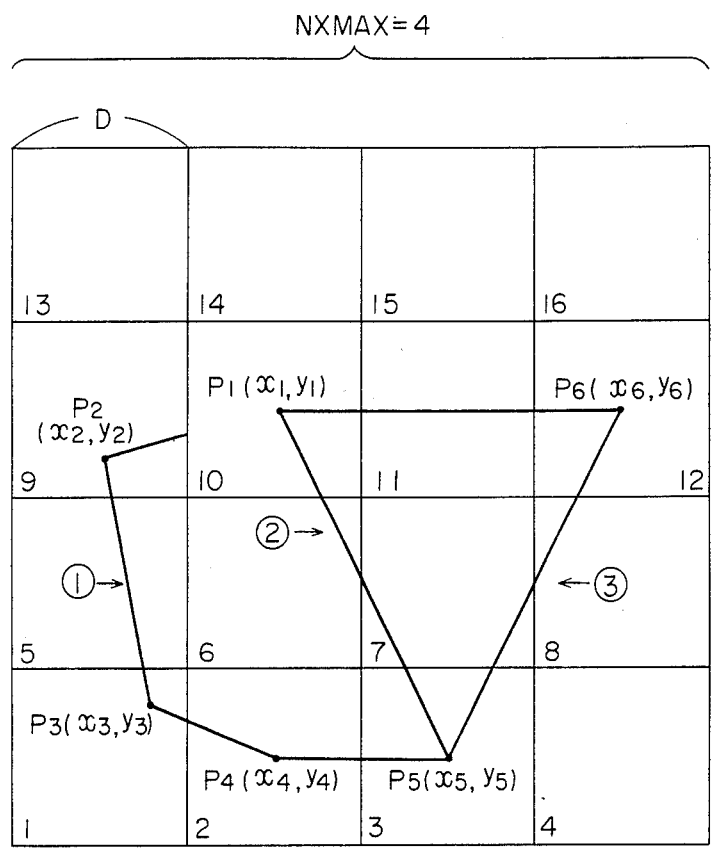
FIG. 11 is a view showing the graphic data of FIG. 3 with its part deleted.
Figure 12:
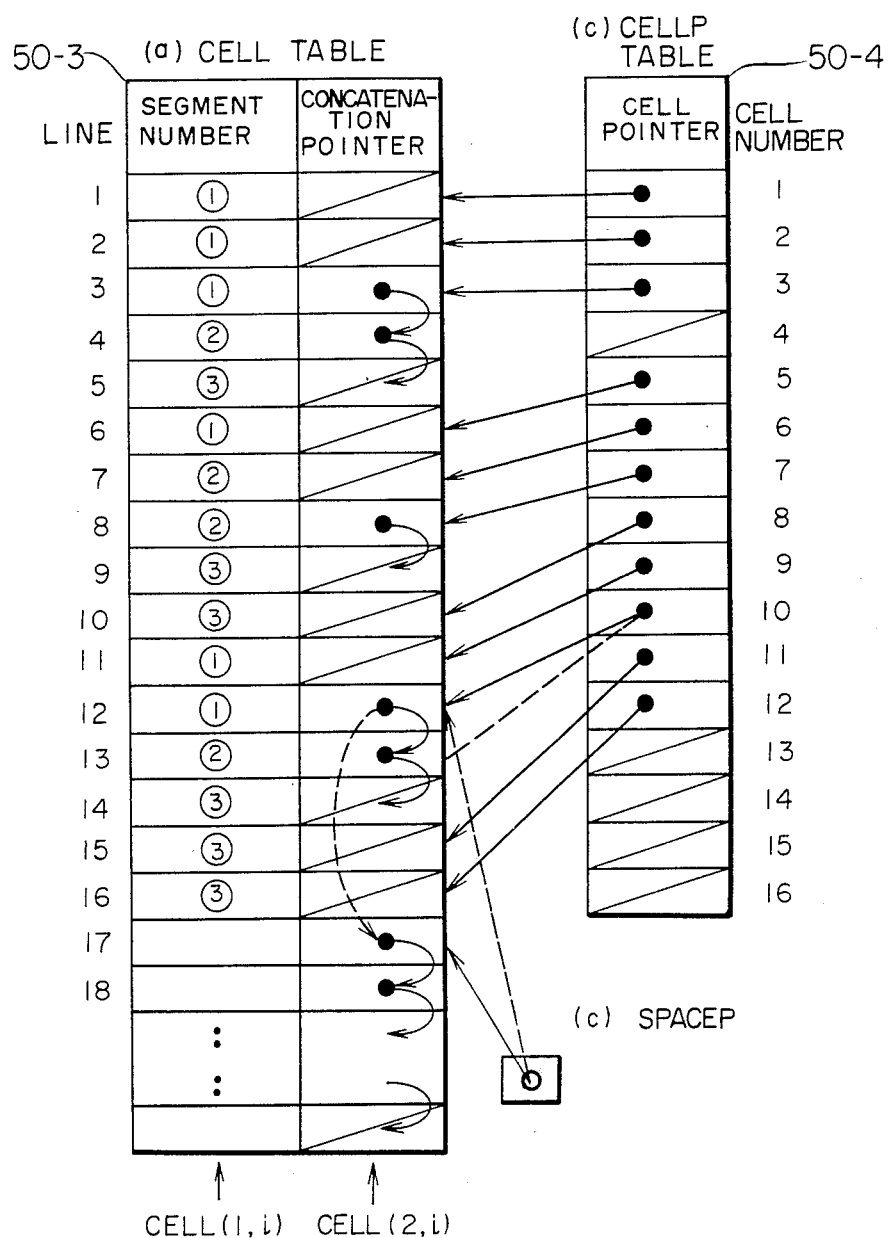
FIG. 12 is a view for explaining the method for operating the index table shown in FIG. 5A when the deletion of a graphic data is performed.

Now referring to the graphic data shown in FIG. 11 and the index table shown in FIG. 12, the deletion process of a part of the segment ① in an area of the cell number 10 will be explained. FIG. 11 shows graphic data when a part of the segment ① in the cell 10 area has been deleted in the graphic data of FIG. 3. FIG. 12 shows the operation of the index table of FIG. 5A with the aforesaid part of the segment ①. The dotted lines in FIG. 12 indicate point destinations after the deletion process has been performed.

First, the process 800 reads out the segment number pointed to by the cell pointer corresponding to the cell number 10.

Next, the processes 805, 810 and 815 checks whether or not the read-out segment number coincides with the segment number ① to be deleted. Since a coincidence is obtained in the term of the 12th line of the CELL table 50-3, the process 825 changes the contents stored in the cell pointer corresponding to the cell number 10 from 12 to 13.

The process 840 changes the contents of the concatenation pointer in the 12th term of the CELL table 50-3, in which the segment number ① each its portion to be deleted is stored, from 13 to 17.

The process 845 changes the contents of the space management pointer from 17 to 12.

Thus, the process of deleting a portion of the segment number ① in the cell number 10 is ended.

As described above, in accordance with this invention, in the addition processing, the concatenation pointers, the space management pointer, etc. can be introduced into the index table to perform a listing operation so that the adding operation can be enhanced in its operation speed so as to have an order of 1. Further, in the deletion processing, the deletion object to be searched can be limited from the data within the cell as in the searching process so that the deletion operation can be enchanced in its operation speed so as to have an order of F. The memory space can also be saved since the deleted area can be dynamically reused.

Incidentally, the method of searching the segment in vector representation as data graphic has been explained so far. However, the high speed search can be also made by registering vector numbers on an index table using a vector as a search unit; inversely, registering closed graphic numbers each consisting of plural segments on the index table; or more generally, registering object identification numbers each having a positional attribute on the index table.

We claim:

1. A graphic data management system for searching, adding or deleting graphic elements of graphic data comprising:
   first memory means for storing coordinate data of characteristic points constituting graphic data which is placed in a multidimensional coordinate space;
   means for partitioning said graphic data into cells in accordance with the spatial position of said graphic data, each cell being identified by a cell number;
   second memory means for storing indexes which includes information indicative of graphic data contained within each cell, said graphic data is indicated in said index as being within a cell when a graphic element of a line segment or a point of said graphic data passes through said cell and said graphic data is an open figure and when a graphic element of a boundary line of said graphic data passes through said cell or said cell is included within an inner area of said boundary line and said graphic data is a closed figure;
   means for obtaining cells within a specified range of said graphic data, said specified range being input to said system by a user of said system in order to specify graphic data to be processed, and for reading out graphic data within said cells of said specified range from said second memory means; and
   means for reading out from said first memory means coordinate data corresponding to said graphic data read-out from said second memory means and for determining whether each characteristic point of said coordinate data read-out from said first memory means is within said specified range.

2. A graphic data management system according to claim 1, wherein said first memory means comprises:
   a segment pointer table for storing, for each graphic element, pointers indicative of coordinate data storing areas in said first memory means; and
   said second memory means includes a cell table for successively relating said areas to said cells, by said indexes, said areas storing graphic elements which pass through each of said cells, and by pointers for each cell.

3. A graphic data management system according to claim 2, wherein said second memory means further comprises space management pointer indicative of a free space in said cell table; and said system further comprises means for storing a number corresponding to a graphic element to be input to said system in the said free space in said cell table pointed to by said space management pointer, reading out contents of a pointer of said area where said graphic element number is stored, storing said contents of said pointer in said space management pointer, reading out from said second memory means, contents of an index corresponding to a cell through which said graphic element to be input passes through, storing said contents of said index in said pointer of said area where said graphic element number of said graphic element to be input was stored.

4. A graphic data management system according to claim 2, wherein said second memory means further comprises:
   a space management pointer indicative of a free space in said cell table; and said system further comprises means for searching, graphic element numbers within said indexes of said cell table of said second memory means for a related cell number, said cell number being indicative of a particular cell, in which a graphic element to be deleted passes through, said graphic element to be deleted having a corresponding graphic element number, writing, in an index corresponding to said related cell number contents of a pointer for an area in which said graphic element number is stored, when an area in which said graphic element number is stored is a top of areas of graphic element numbers related to said related cell number, writing in a pointer of an area immediately before an area of said graphic element number, when said area of said graphic element number is not a top of said areas related to said cell number, contents of said space management pointer, and writing in said space management pointer said contents of said pointer of said area of said graphic element number, to be deleted of said graphic element number.

5. A graphic data management system according to claim 1, further comprising means for inputting a specified searching range, and a display device for displaying graphic elements constituted by coordinate data output from said system.

6. A graphic data management system comprising:

graphic data table means for storing coordinate data of characteristic points constituting graphic elements, said graphic elements passing through cells which are obtained by dividing, into equal parts identified by cell numbers, an area where a graphic element is placed in a multi-dimensional coordinate system;

address data table means for storing destination addresses of said characteristic points, said destination addresses being areas where said characteristic points are stored;

cell pointer table means for storing, for each cell number, cell pointers which indicate partial regions in said address table means; and means for calculating said cell numbers for X coordinates and Y coordinates of a characteristic point within an area where a graphic element is placed, using the size of each of said cells obtained when said area is divided in equal parts and the number of parts into which said area is divided in a direction of an X coordinate;

means for reading out, from said cell pointer table means, a cell pointer correspondidng to each cell number within a specified searching range input by a user of said system for searching a particular range of said graphic elements;

means for reading out, from said address data table means, coordinate data destination addresses, corresponding to said cell pointer read-out from said means for reading out from said cell pointer table means; and means for reading out, from said graphic data table means, coordinate data corresponding to said coordinate destination addresses read-out from said means for reading out from said address data table means.

* * * * *